US008182086B2

(12) United States Patent
Cheong

(10) Patent No.: US 8,182,086 B2
(45) Date of Patent: May 22, 2012

(54) EYEGLASS FRAME, EYEWEAR, AND AN EYEWEAR ASSEMBLY METHOD

(76) Inventor: Lak Cheong, Hong Kong (HK)

( * ) Notice: Subject to any disclaimer, the term of this patent is extended or adjusted under 35 U.S.C. 154(b) by 135 days.

(21) Appl. No.: 12/885,674

(22) Filed: Sep. 20, 2010

(65) Prior Publication Data

US 2012/0069293 A1     Mar. 22, 2012

(51) Int. Cl.
    *G02C 1/08*      (2006.01)
(52) U.S. Cl. ........... 351/90; 351/86; 351/95; 351/97
(58) Field of Classification Search ............ 351/41, 351/44, 83, 86, 90–102
See application file for complete search history.

(56) References Cited

U.S. PATENT DOCUMENTS

| 2,551,144 | A | | 5/1951 | Lindemann et al. |
| 5,815,235 | A | | 9/1998 | Runckel |
| 5,963,295 | A | | 10/1999 | Pernicka |
| 6,086,199 | A | * | 7/2000 | Holland et al. ............ 351/86 |
| D431,258 | S | | 9/2000 | Simioni et al. |
| 6,227,665 | B1 | | 5/2001 | Pernicka et al. |
| D484,173 | S | | 12/2003 | Jannard et al. |
| 6,969,172 | B2 | | 11/2005 | Actis-Datta |
| 7,137,700 | B2 | | 11/2006 | DiChiara et al. |
| D544,019 | S | | 6/2007 | Lane |
| 7,234,808 | B2 | | 6/2007 | Bruck |
| 7,553,014 | B2 | | 6/2009 | Yang et al. |
| 7,695,133 | B2 | | 4/2010 | Bondet |
| 7,712,894 | B2 | | 5/2010 | Tsai |
| 2005/0243271 | A1 | * | 11/2005 | Oura et al. ............ 351/153 |

* cited by examiner

*Primary Examiner* — Huy K Mai
(74) *Attorney, Agent, or Firm* — Robert L. Epstein; Epstein Drangel LLP

(57) ABSTRACT

An eyeglass frame is provided that includes a lens retaining part including first and second lens retaining sections connected by a bridge. One of the sections includes a lens receiving opening defined by a rim having a groove into which an edge of a lens is adapted to be received, and a second opening proximate the lens receiving opening and spaced apart from the bridge. The section also includes a channel extending between the lens receiving opening and the second opening. The channel is adapted to be enlarged to expand the rim such that the edge of the lens can be situated in the groove in the rim. The one section may be formed from a flexible material. The section may be formed from a single piece of molded plastic. The bridge may be substantially non-expandable. An eyewear system is provided, and a method of assembling eyewear is provided.

22 Claims, 4 Drawing Sheets

EYEGLASS FRAME, EYEWEAR, AND AN EYEWEAR ASSEMBLY METHOD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to eyeglasses, and in particular relates to safety glasses lens mechanisms and safety glasses.

2. Description of Prior Art

Personal eye-protection, also referred to herein as safety eyewear and safety eyeglasses, are used to protect a user's eye during an activity which may pose risks to the eyes. Safety eyewear may need to satisfy standards in order to be considered safe (e.g, American standard ASTM F803-1 and European standard EN166). Eyewear satisfying these safety standards may be constructed to offer extra lens retention strength to prevent the lens (which may be a thicker lens type to prevent breakage) from falling out of the frame during high speed particle impact. To achieve this extra lens retention strength, the lens groove may need to be much deeper (for example, a minimum 1 mm) than normal eyeglasses, which may normally only have a groove depth of 0.5 mm. The deeper lens groove, especially in a more rigidly built injection frame style, may make it difficult to insert lenses.

U.S. Pat. No. 7,137,700 to DiChiara, et al. (DiChiara) discusses eyewear frame assembly including impact resistant eyewear frame assembly having a split frame and a fastener reinforcement. The frame has an aperture for receiving a lens and is split to expand upper and lower portions of the frame to insert or remove the lens from the aperture. First and second projections extend outwardly from the upper and lower frame portions, respectively.

U.S. Pat. No. 6,227,665 to Pernicka, et al. (Pernicka) discusses sport eyeglasses having removable lenses formed of a one piece plastic molded frame that includes a pair of lens receiving sections, a pair of opposite strap receiving temple sections and a central bridge section integral with the lens receiving sections are described herein. The bridge section is split to define an upper bridge part and a lower bridge part that are capable of being manually distanced from one another so as to define a gap and allowing lenses to be mounted in the lens receiving sections.

U.S. Pat. No. 7,553,014 to Yang et al. (Yang) discusses a spectacle frame including a spectacle frame front. The spectacle frame front includes a pair of spaced apart and opposed arms. The outer end of at least one arm of the pair of arms includes a lens retainer integral therewith for gripping and retaining a lens between the pair of spaced apart and opposed arms.

Frames may have split ends at the sides (see for example, DiChiara) or in the center (see for example, Pernicka) to allow expansion of the aperture to receive a lens or lenses. However, the split ends may make molding and production difficult, and may not be totally reliable in terms of lens retention as the screws connecting the split ends may tend to loosen over time. This loosening may create a dangerous condition in that the lenses of the safety eyewear may not be secure, but this condition may not be visible upon a visual inspection of the safety eyewear. Additionally, separable temple pieces may reduce the strength of a lens holding system.

BRIEF SUMMARY OF THE INVENTION

The present design includes an opening at the end piece. The opening is connected to the lens area by a channel or another opening. The channel and opening allow the aperture to have a larger degree of stretch while the lens is being inserted into the frame. After the lens is inserted into the lens aperture, a barrel and screw are passed through the cut and tightened, thereby locking the lens into the lens groove in the frame.

An eyeglass frame is provided that includes a lens retaining part including first and second lens retaining sections connected by a bridge. One of the sections includes a lens receiving opening defined by a rim having a groove into which an edge of a lens is adapted to be received, and a second opening proximate the lens receiving opening and spaced apart from the bridge. The section also includes a channel extending between the lens receiving opening and the second opening. The channel is adapted to be enlarged to expand the rim such that the edge of the lens can be situated in the groove in the rim. The one section may be formed from a flexible material. The section may be formed from a single piece of molded plastic. The bridge may be substantially non-expandable.

The eyeglass frame may include a temple piece connected to the one section. The temple piece may be adapted to engage an ear of a user when the frame is worn by the user. The temple piece may be connected to the one section proximate to the second opening.

The eyeglass frame may further including a removable tension arrangement intersecting the channel for preventing the channel from enlarging when the lens receiving opening is subjected to an expanding force. The tension arrangement may include a screw, and the screw may be substantially orthogonal to the channel.

The eyeglass frame may further include a cover adapted to be received into the second opening. The cover may cover substantially all of the channel on an outward side. The eyeglass frame may further include a lens adapted to be inserted into the lens receiving opening and engaging the groove in the rim.

An eyewear apparatus is provided that includes a first lens retainer including a first opening defined by a first rim having a first groove, and a second lens retainer including a second opening defined by a second rim having a second groove. The eyewear apparatus also includes a bridge element connecting the first and second lens retainers. The eyewear apparatus further includes a first enlarging element associated with the first lens retainer and for enlarging the first rim. The first enlarging element includes a first proximate opening spaced apart from the bridge element and a first channel connecting the first proximate opening and the first opening. The eyewear apparatus also includes a second enlarging element associated with the second lens retainer and for enlarging the second rim. The second enlarging element includes a second proximate opening spaced apart from the bridge element and a second channel connecting the second proximate opening and the second opening.

The first and second lens retainers, the bridge element, and the first and second enlarging elements may be formed from an elastic material. The first and second lens retainers, the bridge element, and the first and second enlarging elements may be formed from a single piece of molded plastic.

The eyewear apparatus may further include a first temple piece connected to the first enlarging element, and a second temple piece connected to the second enlarging element.

The eyewear apparatus may further include a first removable tension arrangement intersecting the first channel for preventing the first channel from opening when the first opening is subjected to a first opening force. The eyewear apparatus may also include a second removable tension arrangement intersecting the second channel for preventing the second channel from opening when the second opening is subjected to a second opening force. The first tension arrangement may include a first screw situated substantially orthogonal to the first channel, and the second tension arrangement may include a second screw situated substantially orthogonal to the first channel.

The eyewear apparatus may further include a first cover inserted into the first proximate opening and filling the first proximate opening and covering substantially all of a first outward side of the first channel. The eyewear apparatus may also include a second cover inserted into the second proximate opening and filling the second proximate opening and covering substantially all of a second outward side of the second channel.

The eyewear apparatus may further include a first lens inserted into the first opening and engaging the first groove in the first rim, and a second lens inserted into the second opening and engaging the second groove in the second rim.

An eyewear system is provided that includes a lens receiving openings defined by a rim having a groove into which an edge of a lens is adapted to be received, and a bridge connecting the lens receiving opening with another lens receiving opening. The eyewear system also includes an arrangement for enlarging situated proximate to the lens receiving opening and spaced apart from the bridge. The enlarging arrangement includes a second opening and a channel extending between the lens receiving opening and the second opening. The second opening and the channel are adapted to enlarge the rim when subjected to an enlarging force.

The eyewear system may further include an arrangement for engaging an ear of a user when the eyewear system is worn by the user. The arrangement for engaging an ear may be connected to the enlarging arrangement. The eyewear system may also include a removable tension arrangement for preventing the channel from opening when subjected to the enlarging force.

A method of assembling eyewear is provided. A frame of the eyewear includes a lens retaining part including first and second lens retaining sections connected by a bridge. One of the sections includes a lens receiving opening defined by a rim having a groove into which an edge of a lens is adapted to be received. The one section further includes a second opening proximate the lens receiving opening and spaced apart from the bridge. The one section also includes a channel extending between the lens receiving opening and the second opening. The channel is adapted to be enlarged to expand the rim such that the edge of the lens can be situated in the groove in the rim, The method includes applying oppositely oriented outward pulling forces to both sides of the channel causing the channel to separate and the lens receiving opening to enlarge. The method also includes inserting a lens into the lens receiving opening, and stopping the application of force to both sides of the channel.

The method may include applying oppositely oriented outward pulling forces to both sides of another channel associated with the other one of the sections causing the other channel to separate and another lens receiving opening associated with the other one of the sections to enlarge. The method may further include inserting another lens into the other lens receiving opening, and stopping the application of force to both sides of the other channel.

DETAILED DESCRIPTION OF THE INVENTION

Safety eyewear according to an exemplary embodiment of the present innovation include a replaceable lens that is removable and insertable due to expansion of a lens area (also referred to herein as an aperture, hole or opening) and an opening (also referred to herein as a hole) positioned toward the temple piece and connected to the lens area by a channel (also referred to herein as a cut or slit).

The channel, along with the opening, provides a flexing arrangement for each lens holding area. The flexing arrangement enables the lens area to be enlarged based on the inherent elasticity of the material of the frame. For instance, a single piece of molded plastic may be used for the portion of the frame including the lens retaining elements, the bridge and the flexing arrangements. The inherent elasticity of plastic, combined with the geometric configuration of the flexing arrangement (including the opening and channel) allows the lens retaining area to be enlarged to insert the lens into the deeper groove of the safety eyeglasses. After insertion, a tensioner, for instance a screw or other fastening element, may be secured across the channel, preventing it from opening. In this manner, the lens retaining area may be accessible when the tensioner is not in place, and not accessible when the tensioner is secured.

The present innovation may be used with safety glasses, which may or may not have a prescription. The safety lenses may have a center-thickness of above 2 mm to provide impact resistance. The safety lenses may be a polycarbonate lens with UV, anti-fog and scratch-resistance coatings. Additionally, the present innovation may also be used with conventional glasses.

The present innovation may include a slanted v-shaped groove for high impact lens retention. The groove may have a higher back-wall than a front-wall, and in particular may have a 1.6 mm higher back-wall. The tensioner used to secure the channel closed may be a stainless steel rimlock barrel and screw. The safety glasses according to an exemplary embodiment may include an elastic element inserted into the opening. The elastic element may be detachable from the safety glasses, and may operate as a front shock damper, an inner safety side-cushion, and an aesthetic element. The exemplary safety glasses may include an extended soft nose pad for extra protection and/or comfort. The elastic element and/or the nose pad may be rubber and/or any other appropriate soft, elastic and/or hypoallergenic material. An anti-slip temple pad may also be provided and may also be made of the same material or another material as the elastic elements and/or nose pads.

The exemplary safety glasses may include a headband engagement lock and/or an adjustable velcro headband in stretchable wet-suit material (i.e., washable). The exemplary frame material may be high viscosity polycarbonate material for added impact resistance.

Figure 1:
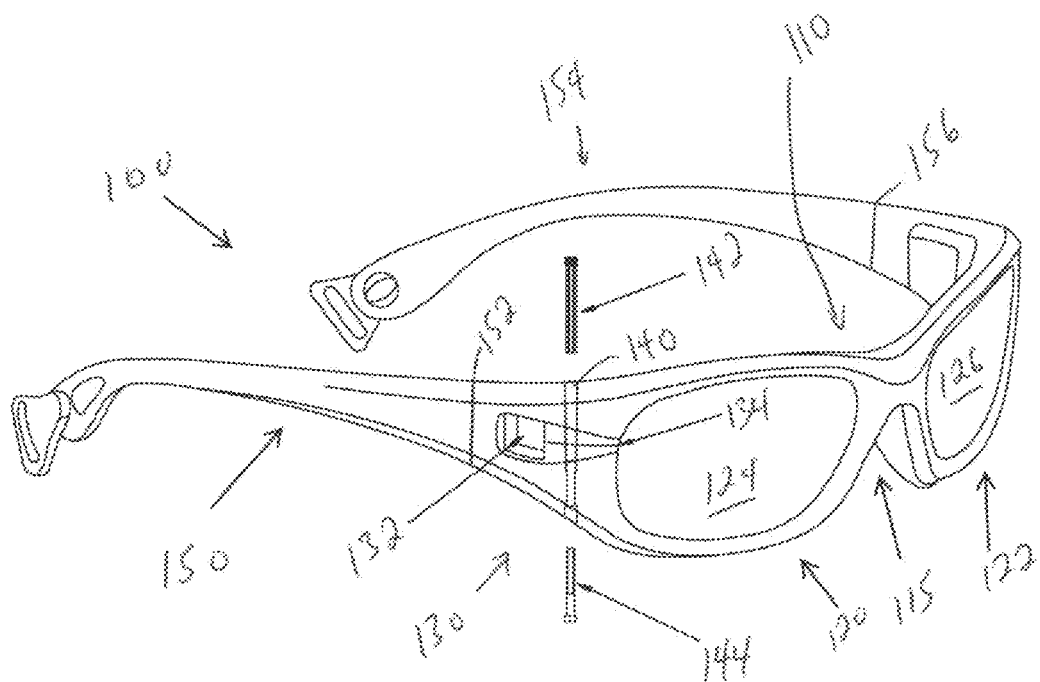
FIG. 1 is a perspective view of an eyeglass frame in accordance with an exemplary embodiment.

FIG. 1 is a perspective view of eyeglass frame 100 in accordance with an exemplary embodiment. Eyeglass frame 100 includes opening 132 and channel 134 between lens aperture 124 and opening 132. Channel 134, together with opening 132, allows lens aperture 124 to have an increased degree of stretch for lens insertion. Tightening barrel 142 and screw 144 going through channel 134 will further lock a lens inserted in lens aperture 124 in the groove provided in lens aperture 124 to ensure a more secure retention of the lens. Opening 132 can be any shape depending on frame design.

FIG. 1 illustrates eyeglass frame 100 including lens retaining part 110 and temple pieces 150 and 154. Lens retaining part 110 may be formed from a single piece of molded plastic. Temple pieces 150 and 154 may each be formed from single pieces of molded plastic, and may attach to lens retaining part 110 with connections 152 and 156, respectively. Connections 152 and 156 may be hinges or any other appropriate connection mechanism.

Lens retaining part 110 may include lens retaining sections 120 and 122 connected by bridge 115. Lens retaining sections 120 and 122 may define lens apertures 124 and 126, respectively. Lens apertures 124 and 126 may have grooves for engaging safety lenses which are deeper than standard lens grooves in eyeglass frames. Lens retaining part 110 may also include opening 132 on a side of lens retaining section 120 opposite bridge 115. Alternatively, opening 132 may be in another area proximate to lens retaining section 120. Opening 132 may extend through lens retaining part 110, and may connect with channel 134 to lens aperture 124. Therefore, opening 132, channel 134, and aperture 124 may form one opening in lens retaining part 110. This opening may be substantially larger than aperture 124, and may therefore enable aperture 124 to be stretched into a larger opening to accommodate safety lenses adapted to engage a deep groove in the rim of aperture 124. The stretching of aperture 124 may be facilitated by the elastic material of lens retaining part 110, which may be plastic or any other appropriate material. Opening 132 and channel 134 may together form enlarging element 130, which may also be referred to herein as a flexing arrangement. Another opening and channel may be provided for lens retaining section 122.

Enlarging element 130 may also include hole 140 adapted to accommodate barrel 142 and screw 144. Barrel 142 and screw 144 may cooperate to form a tensioning element that prevents the opening of channel 134. Screw 144 may be inserted into a bottom of hole 140, and barrel may be inserted into a top of hole 140 (or vice versa), when a lens has been inserted into aperture 124. In this manner, the lens may be secured in aperture 124 by preventing the opening of channel 134.

Figure 2:
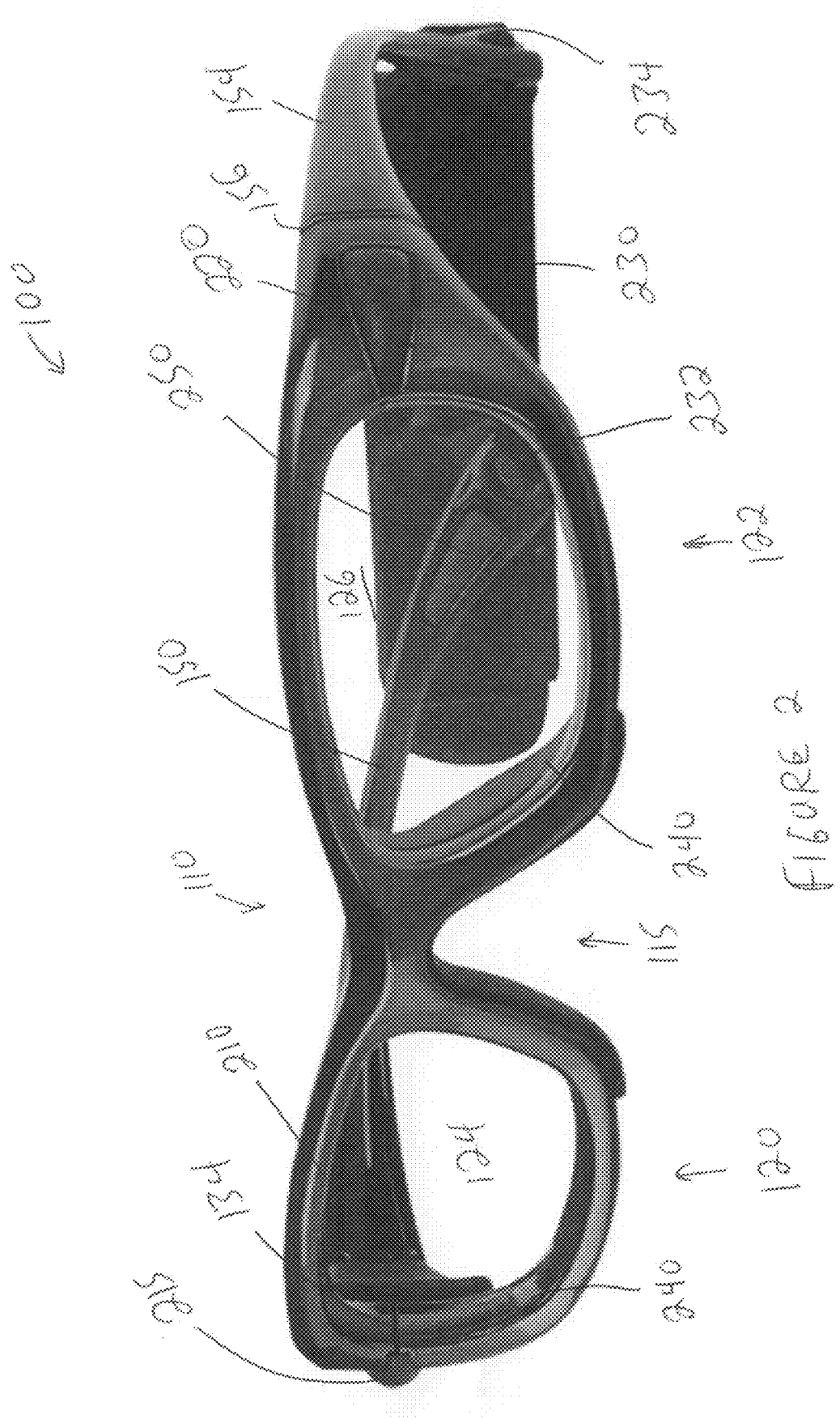
FIG. 2 is a frontal perspective view of an eyeglass frame in accordance with an exemplary embodiment.

FIG. 2 is a frontal perspective view of eyeglass frame 100 assembled and including several accessories. Eyeglass frame 100 includes lens retaining part 110 and temple pieces 150 and 154. Temple piece 154 attaches to lens retaining part 110 with connection 156, which may be a hinge. Lens retaining part 110 may include lens retaining sections 120 and 122 connected by bridge 115. Lens retaining sections 120 and 122 may define lens apertures 124 and 126, respectively. Lens aperture 124 includes groove 200 for engaging a safety lens. Lens aperture 126 accommodates lens 240, which may be a safety lens.

FIG. 2 also illustrates channel 134 on groove 200 of lens aperture 124. An outer face or outward side of channel 134 is covered by cover 215. Cover 215 may be integral or attach to an insert substantially filling or traversing the opening corresponding to channel 134 and may extend to an inward side of eyeglass frame 100. Shock absorber 210 may be an inward side of the element occupying the opening, and may therefore be integral with cover 215. Cover 220 may cover a channel and opening corresponding to lens aperture 126.

Eyeglass frame 100 of FIG. 2 includes several accessories, including headband 230, which may be two parts connected by velcro, or alternatively may be one stretchable piece of fabric. Headband 230 may be neoprene or any other appropriate material. Headband 230 may attach to eyeglass frame 100 at an end of temple pieces 150 and 154 by anchors 232 and 234, respectively. Anchors 232 and 234 may be reversibly detachable. Temple piece 150 may include temple pad 250, which may be rubber and/or removable, and may provide an anti-slip function to provide a more secure fit for eyeglass frame 100 for a user.

Figure 3:
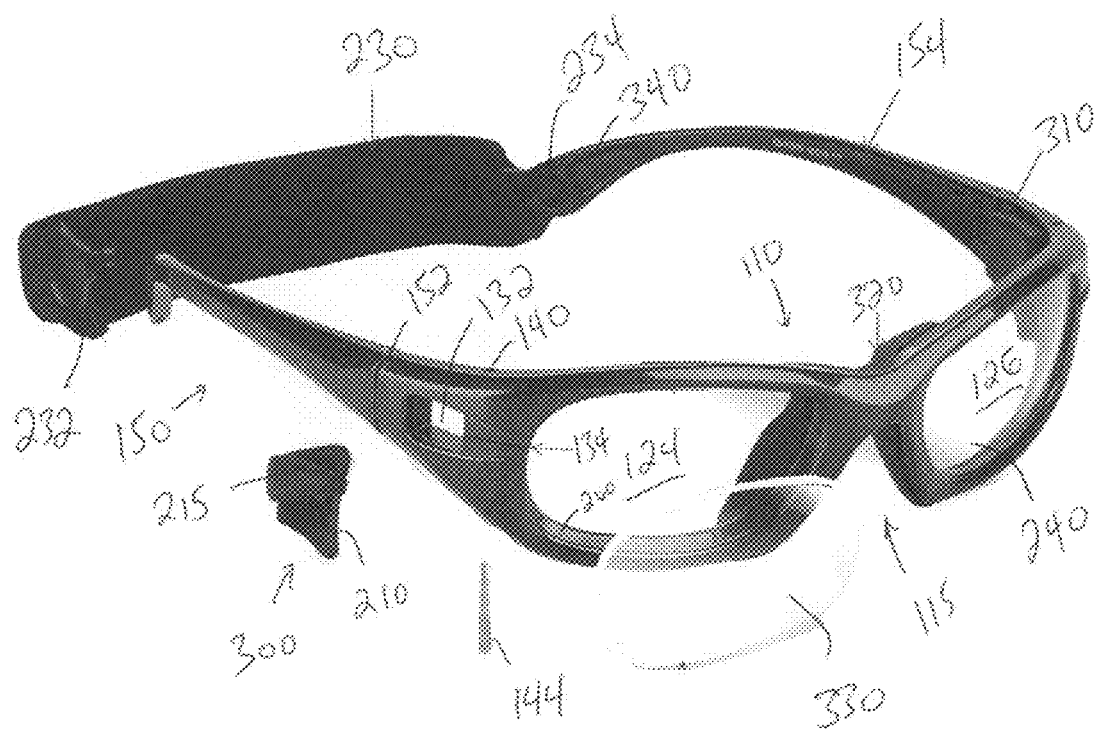
FIG. 3 is a perspective, partially exploded view of the eyeglass frame of FIG. 2 in accordance with an exemplary embodiment.

FIG. 3 is a perspective, partially exploded view of the eyeglass frame of FIG. 2 in accordance with an exemplary embodiment. Eyeglass frame 100 in FIG. 3 is partially assembled and includes several accessories in a partially assembled condition. Eyeglass frame 100 includes lens retaining part 110 and temple pieces 150 and 154. Temple piece 150 attaches to lens retaining part 110 with connection 152, which may be a hinge. Lens aperture 124 includes groove 200 for engaging safety lens 330. Lens aperture 126 accommodates lens 240, which may be a safety lens.

Eyeglass frame 100 in FIG. 3 includes opening 132 and channel 134 between lens aperture 124 and opening 132. Channel 134, together with opening 132, allows lens aperture 124 to have an increased degree of stretch for lens insertion. Tightening 144 to a corresponding barrel, or alternatively directly to lens retaining part 110, through hole 140 passing through channel 134 orthogonally will further lock a lens inserted in lens aperture 124 in the groove provided in lens aperture 124 to ensure a more secure retention of the lens.

Element 300 is shown detached from eyeglass from 100, and it may be removably attachable. Element 300 may occupy opening 132 and may cover an outer face or outward side of channel 134 with cover 215 of element 300 when inserted into opening 132. Element 300 may be inserted into opening 132 and may extend to an inward side of eyeglass frame 100. Shock absorber 210 of element 300 may be the inward side of the element occupying opening 132. Shock absorber 310 of an element for the opposite side of eyeglass frame 100 corresponding to lens aperture 126 is shown in an installed condition in FIG. 3 occupying the corresponding opening. Element 300 may be elastic, and/or may be a soft, hypoallergenic rubber. In alternative embodiments, element 300 may be rigid or semi-rigid and may be two or more separable parts that may be reversibly or irreversibly connectable.

Bridge 115 may include nose pad 320 on an inner side facing a user's face when eyeglass frame 100 is worn on a face. Nose pad 320 may provide a comfort and safety function, may be hypoallergenic, may be rubber or another appropriate soft, elastic material, and may be reversibly removable.

Eyeglass frame 100 of FIG. 3 includes several accessories, including headband 230, which may attach to eyeglass frame 100 at an end of temple pieces 150 and 154 by anchors 232 and 234, respectively. Anchor 232 is shown in FIG. 3 as detached, and anchor 234 is shown attached. Temple piece 154 may include temple pad 340, which may be rubber and/or removable, and may provide an anti-slip function to provide a more secure fit for eyeglass frame 100 for a user.

Figure 4:
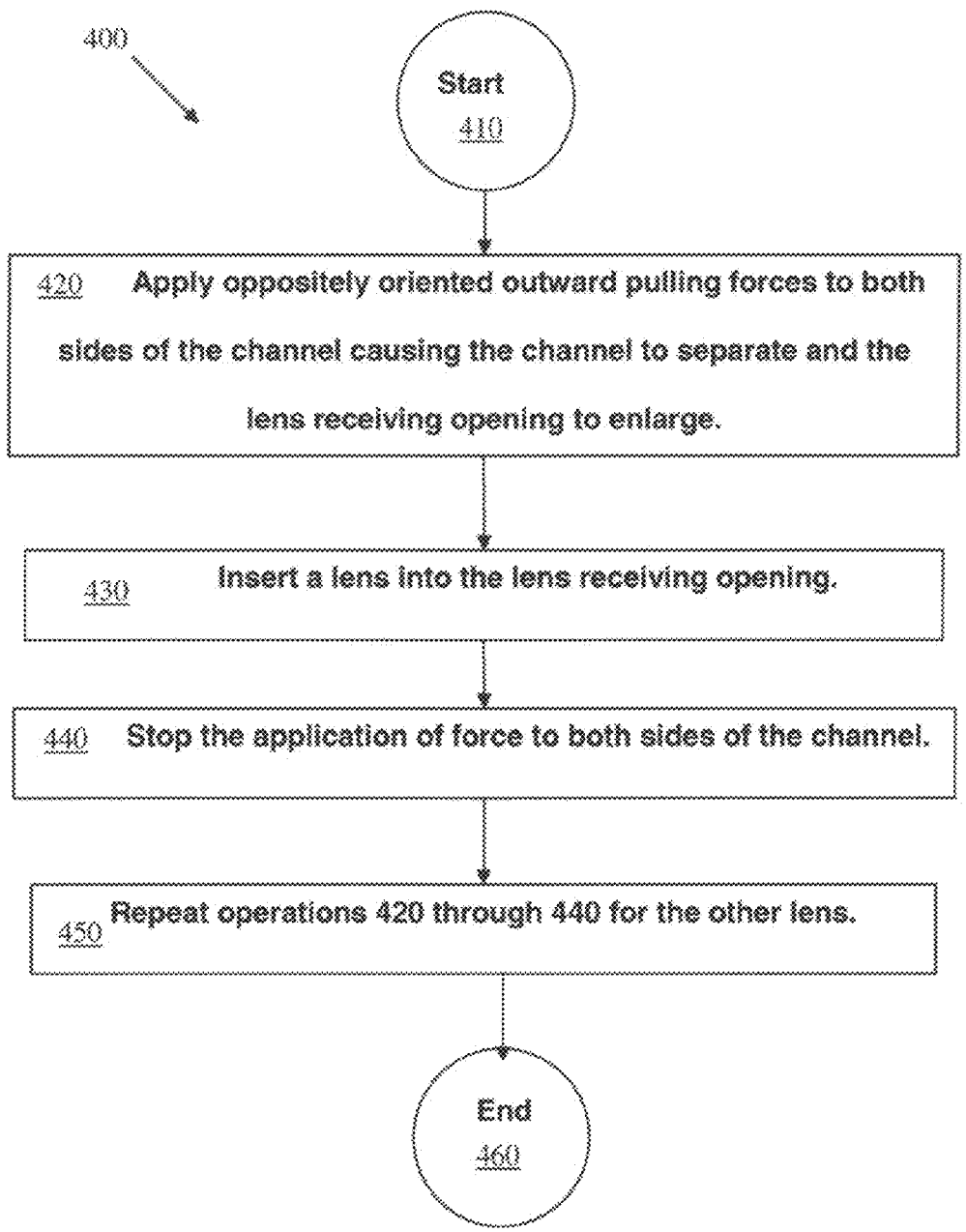
FIG. 4 illustrates a method according to an exemplary embodiment.

FIG. 4 illustrates method 400 according to an exemplary embodiment. Method 400 starts at start circle 410 and proceeds to operation 420, which indicates to Apply oppositely oriented outward pulling forces to both sides of the channel causing the channel to separate and the lens receiving opening to enlarge. From operation 420 the flow in method 400 proceeds to operation 430, which indicates to Insert a lens into the lens receiving opening. From operation 430 the flow in method 400 proceeds to operation 440, which indicates to Stop the application of force to both sides of the channel. From operation 440 the flow in method 400 proceeds to operation 450, which indicates to Repeat operations 420 through 440 for the other lens. From operation 450 the flow in method 400 proceeds to end circle 460.

As is apparent from the foregoing discussion, the present innovation is a lens assembly mechanism having an opening and a channel in the temple area. The exemplary safety glasses include a lens assembly mechanism constructed to offer extra lens retention strength to prevent the lens from falling out of the frame during a high speed particle impact. The assembly mechanism includes a frame having a lens groove which is deeper than the groove in normal eyeglass frames. The frames also include an opening at the end piece and a channel between the lens aperture and the opening to allow greater flexibility when inserting the lens into the frame. The channel is intersected, or more particularly bisected orthogonally, by a tensioner which may be a screw to prevent opening of the lens aperture and release of the lens after insertion and during use.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

I claim:

1. An eyeglass frame comprising a lens retaining part comprising first and second lens retaining sections connected by a bridge, one of said sections comprising:
    a lens receiving opening defined by a rim having a groove into which an edge of a lens is adapted to be received;
    a second opening proximate said lens receiving opening and spaced apart from said bridge; and
    a channel extending between said lens receiving opening and said second opening, said channel being adapted to be enlarged to expand said rim such that said edge of said lens can be situated in said groove in said rim.

2. The eyeglass frame of claim 1, wherein said one section is formed from a flexible material.

3. The eyeglass frame of claim 1, wherein said one section is formed from a single piece of molded plastic.

4. The eyeglass frame of claim 1, wherein said bridge is substantially non-expandable.

5. The eyeglass frame of claim 1, further comprising a temple piece connected to said one section, said temple piece being adapted to engage an ear of a user when said frame is worn by said user.

6. The eyeglass frame of claim 5, wherein said temple piece is connected to said one section proximate to said second opening.

7. The eyeglass frame of claim 1, further comprising a removable tension arrangement intersecting said channel for preventing said channel from enlarging when said lens receiving opening is subjected to an expanding force.

8. The eyeglass frame of claim 7, wherein:
    said tension arrangement comprise a screw; and
    said screw is substantially orthogonal to said channel.

9. The eyeglass frame of claim 1, further comprising a cover adapted to be received into said second opening, said cover covering substantially all of said channel on an outward side.

10. The eyeglass frame of claim 1, further comprising a lens adapted to be inserted into said lens receiving opening and engaging said groove in said rim.

11. An eyewear apparatus, comprising:
    a first lens retainer comprising a first opening defined by a first rim having a first groove;
    a second lens retainer comprising a second opening defined by a second rim having a second groove;
    a bridge element connecting the first and second lens retainers;
    a first enlarging element associated with the first lens retainer and for enlarging the first rim, the first enlarging element comprising a first proximate opening spaced apart from the bridge element and a first channel connecting the first proximate opening and the first opening; and
    a second enlarging element associated with the second lens retainer and for enlarging the second rim, the second enlarging element comprising a second proximate opening spaced apart from the bridge element and a second channel connecting the second proximate opening and the second opening.

12. The eyewear apparatus of claim 11, wherein the first and second lens retainers, the bridge element, and the first and second enlarging elements are formed from an elastic material.

13. The eyewear apparatus of claim 11, wherein the first and second lens retainers, the bridge element, and the first and second enlarging elements are formed from a single piece of molded plastic.

14. The eyewear apparatus of claim 11, further comprising:
    a first temple piece connected to the first enlarging element; and
    a second temple piece connected to the second enlarging element.

15. The eyewear apparatus of claim 11, further comprising:
    a first removable tension arrangement intersecting the first channel for preventing the first channel from opening when the first opening is subjected to a first opening force; and
    a second removable tension arrangement intersecting the second channel for preventing the second channel from opening when the second opening is subjected to a second opening force.

16. The eyewear apparatus of claim 15, wherein:
    the first tension arrangement comprises a first screw situated substantially orthogonal to the first channel; and
    the second tension arrangement comprises a second screw situated substantially orthogonal to the first channel.

17. The eyewear apparatus of claim 11, further comprising:
    a first cover inserted into the first proximate opening and filling the first proximate opening and covering substantially all of a first outward side of the first channel; and
    a second cover inserted into the second proximate opening and filling the second proximate opening and covering substantially all of a second outward side of the second channel.

18. The eyewear apparatus of claim 11, further comprising:
    a first lens inserted into the first opening and engaging the first groove in the first rim; and
    a second lens inserted into the second opening and engaging the second groove in the second rim.

19. An eyewear system comprising:
a lens receiving openings defined by a rim having a groove into which an edge of a lens is adapted to be received;
a bridge connecting the lens receiving opening with another lens receiving opening; and
means for enlarging situated proximate to said lens receiving opening and spaced apart from the bridge, said enlarging means comprising a second opening and a channel extending between said lens receiving opening and said second opening, said second opening and said channel being adapted to enlarge said rim when subjected to an enlarging force.

20. The eyewear system of claim 19, further comprising:
means for engaging an ear of a user when the eyewear system is worn by said user, said means for engaging an ear being connected to said enlarging means; and
removable tension means for preventing said channel from opening when subjected to said enlarging force.

21. A method of assembling eyewear, a frame of the eyewear comprising a lens retaining part comprising first and second lens retaining sections connected by a bridge, one of said sections comprising a lens receiving opening defined by a rim having a groove into which an edge of a lens is adapted to be received, said one section further comprising a second opening proximate said lens receiving opening and spaced apart from said bridge, and said one section further comprising a channel extending between said lens receiving opening and said second opening, said channel being adapted to be enlarged to expand said rim such that said edge of said lens can be situated in said groove in said rim, the method comprising:
applying oppositely oriented outward pulling forces to both sides of the channel causing the channel to separate and the lens receiving opening to enlarge;
inserting a lens into the lens receiving opening; and
stopping the application of force to both sides of the channel.

22. The method of claim 21, further comprising:
applying oppositely oriented outward pulling forces to both sides of another channel associated with the other one of said sections causing the other channel to separate and another lens receiving opening associated with the other one of said sections to enlarge;
inserting another lens into the other lens receiving opening; and
stopping the application of force to both sides of the other channel.

\* \* \* \* \*